S. M. LILLIE.
APPARATUS FOR CONVERTING STARCH BY A CONTINUOUS OPERATION INTO DERIVATIVES, DEXTRIN, DEXTROSE, &c.
APPLICATION FILED MAY 23, 1910.
1,014,311.
Patented Jan. 9, 1912.
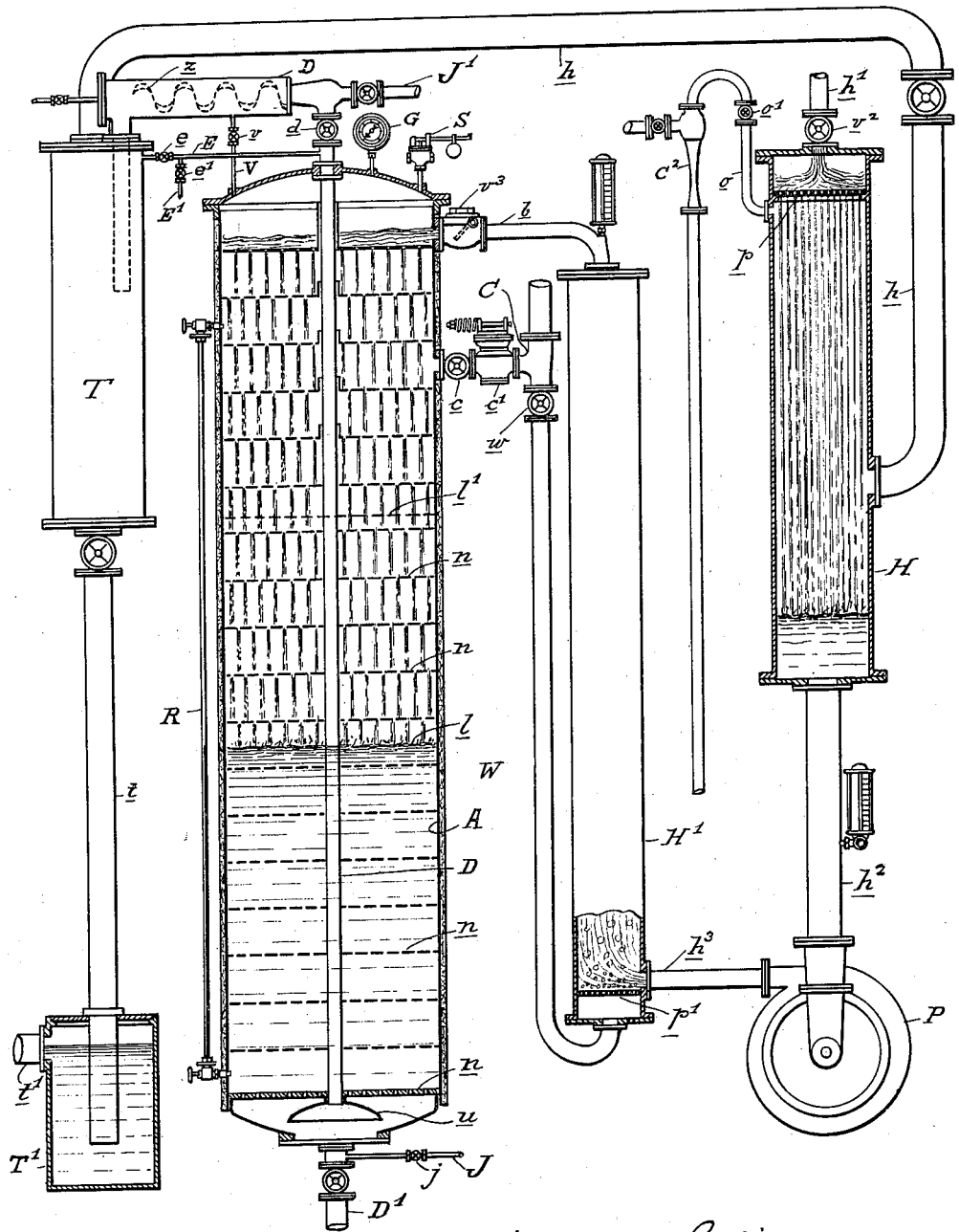
WITNESSES:
John J. Walter
Colin D. Smith
S. Morris Lillie  INVENTOR

UNITED STATES PATENT OFFICE.

SAMUEL MORRIS LILLIE, OF PHILADELPHIA, PENNSYLVANIA.

APPARATUS FOR CONVERTING STARCH BY A CONTINUOUS OPERATION INTO DERIVATIVES, DEXTRIN, DEXTROSE, &c.

1,014,311. Specification of Letters Patent. Patented Jan. 9, 1912.

Application filed May 23, 1910. Serial No. 563,028.

*To all whom it may concern:*

Be it known that I, SAMUEL MORRIS LILLIE, a citizen of the United States, residing at Philadelphia, in the county of Philadelphia and State of Pennsylvania, have invented a new and useful Apparatus for Converting Starch by a Continuous Operation into Derivatives, Dextrin, Dextrose, &c., of which the following is a specification.

The method usually employed for the conversion of starch into these derivatives is an intermittent operation, which is to nearly fill a closed vessel "converter" provided with a perforated steam heating coil with a mixture of starch, water and a small proportion of acid, heat the mixture under pressure by injected steam to the desired converting temperature, say 280° Fah., shut off the steam and allow the heated mixture to stand until the mass of the mixture has been converted to the desired degree as indicated by a reagent, usually a solution of iodin. A discharge valve is then opened and the contents of the converter discharged into a tank open to the atmosphere, the vapors due to the reduction in pressure passing away into the atmosphere to waste. The converter is then recharged with the acid starch mixture and another conversion made. Each batch of converted liquor after leaving the converter is neutralized by a suitable reagent, as carbonate of soda, for example. The conversion of the starch progresses with the duration of its heated stay in the converter, which if long enough will carry it through the several conditions of starch paste, soluble starch, and dextrin to dextrose. The charge is kept in the converter until it has arrived at the desired degree of conversion. The portion of the charge first to leave the converter is less converted than the portion which leaves the converter last, for the latter is subjected to the heat as much longer than the former as it takes to empty the converter, and the two show with reagents quite different stages of conversion. This lack of uniformity in the conversion is one of the faults of this usual method of converting starch which it is the purpose of my invention to obviate. Other faults of this process are the loss of heat in the escaping vapors and the intermittent demand for steam on the boilers. The converter makes a heavy demand while the charge is being heated to the converting temperature and then none at all until the next charge is heated.

The purpose of my invention is to provide apparatus adapted to practice a continuous process of converting starch by means of heat, acid and water into derivatives, dextrin, dextrose, &c., and to obtain a practically uniform conversion, a constant draw of steam from the boilers, a useful heating effect from the escaping vapors, and other advantages incidental to a continuous process.

I show in the accompanying drawings, and describe in the following specification apparatus illustrative of my invention.

The vertical cylinder A is the "converting column" vessel. In it are contained a number of horizontal perforated diaphragms $n$, $n$, etc., of approximately the same diameter as the interior of the cylinder and equally spaced one above the other, the lowest diaphragm a little above the bottom of the cylinder, and the uppermost one a little below the top of the cylinder. A discharge pipe D, shown axial in the figure, extends from below the lowest diaphragm where it is fitted with the inverted cup $u$ up through them all and through the top of the cylinder and leads into an empty expension chamber T, which has an outlet above through the pipe $h$, which leads into a spray condenser or heater H, hereinafter more fully described. Below, the tank T has a drain pipe $t$, which leads down into and nearly to the bottom of the sealing tank T'—which tank has an overflow pipe $t'$. The discharge pipe D is fitted with a suitable valve $d$. A pipe D' fitted with a valve leads from the bottom of the cylinder A and serves for draining the same if desired.

C is a steam pipe which opens into the cylinder below a number of the upper diaphragms, but above the level to which the converting column of liquor will in practice ever rise as hereinafter described. The pipe C is fitted with a hand valve $c$ and also with a pressure reducing valve $c'$. The cylinder A is provided with safety valve S, pressure gage G, and an air vent pipe V, with valve $v$, leading into the pipe D beyond the valve $d$, and communicating with the heater H through the pipe D chamber T and pipe $h$. Means for indicating the height of liquor in the cylinder are provided, such as the gage glass R on the side of the cylinder. A small test pipe E with valve $e$ leads from the discharge pipe D at a point below its valve $d$ into the tank T. Between its valve $e$ and the pipe D is a small branch pipe E' fitted with a valve $e'$ and opening into the atmosphere. A small pipe J, fitted with valve $j$, leads into the cylinder below the lower diaphragm in the same, and immediately under the inverted cup $u$ of the discharge pipe D.

The spray condenser, or heater H consists of a vertical cylinder, closed top and bottom, shown in vertical axial section in the drawing, containing near the top a distributing device such as a horizontal perforated plate $p$ upon which delivers through the top of the heater the liquor conducting pipe $h'$ which is fitted with a hand valve $v^2$ and leads from a source of supply of the mixture of starch, water and converting agent such as muriatic acid for example, which is to be treated in the apparatus being described. From the bottom of the heater H a pipe $h^2$ leads to the suction of a high pressure centrifugal pump P. Into the side of the heater a short distance above the bottom leads the pipe $h$, from the pressure reducing tank T. From the heater just below the perforated plate $p$ leads a vent pipe $o$ having a valve $o'$. This vent pipe $o$ leads to a vacuum producing apparatus, such as the common ejector condenser $C^2$, by which a partial vacuum may be maintained in the heater H.

H' is a heater in which higher pressure steam is used for heating purposes. It is a vertical cylinder closed top and bottom: it is shown in vertical section from the bottom for a short distance upward to disclose one form of internal construction. Through the bottom of the heater opens a live steam pipe W which is fitted with a hand valve $w$. In the heater a little above the bottom is a perforated horizontal plate $p'$ just above which there opens into the heater the pipe $h^3$, which connects to the discharge nozzle of the centrifugal pump P. From the top of the heater H', a discharge pipe $b$ leads into the converting column cylinder A above the upper diaphragm in the same. This pipe may be fitted with a thermometer for indicating the temperature of the liquid flowing from the heater into the cylinder A and with a check valve $v^3$ which opens toward the cylinder A.

The mode of using this apparatus for the continuous conversion of starch is as follows: Air is first driven from the system by opening the valves $d$, $v$, and $o'$ respectively in the pipe D, vent pipe V and vent pipe $o$, the latter of the heater H, and then admitting steam into the bottom of heater H' through the live steam pipe W by opening the valve $w$. When the pipes D, $v$, and $o$ grow hot due to escaping steam the air may be considered as expelled and the valves in the said pipes closed. The hand valve $c$ on the live steam line C to the converting column cylinder A is now opened, and the automatic pressure reducing valve $c'$ is set to maintain a steam pressure in the cylinder corresponding to or a little above the desired converting temperature say 280° Fahr. The safety valve S is set for a little above this pressure and the centrifugal pump P is started. The mixture of starch water and acid (mixed in proportions which are kept preferably practically constant) is now allowed to flow into the top of the heater H through the pipe $h'$, by opening the valve $v^2$ at a constant rate—regulated by means of said valve—which will pass the wished for quantity of material through the system per unit of time. The starch liquor passes from the bottom of the heater H through the pipe $h^2$ into the centrifugal pump P, which delivers the liquor as fast as it comes through the pipe $h^3$ into the bottom of the heater H'. The centrifugal pump is so proportioned and is maintained at such a speed as will do this and deliver the liquor under such a pressure as will force it up through the heater H' into the converting column cylinder A against the pressure in the latter. As soon as the starch liquor begins to enter the bottom of heater H', live steam is turned into the bottom of the heater through the pipe W by means of the valve $w$ which is regulated so that the starch liquor passes from the top of the heater H' through the pipe $b$ and check valve $v^3$ into cylinder A at or a little below the converting temperature say 280° Fahr. which corresponds to about 35 pounds pressure above atmospheric. The heated acidulated starch liquor flows on to the upper perforated plate in the cylinder A at a constant speed, viz. that at which it is delivered into the heater H through the pipe $h'$. The heater H' is so proportioned in size with respect to the normal flow of starch liquor that the latter will be in it only long enough to be converted partially, leaving a good part of the converting to be done in the cylinder A. If conditions are maintained constant as to rate of flow of the liquor and the quantity and pressure of steam delivered into the heater H', the liquor will enter the cylinder A at a practically uniform state of conversion.

When, in putting the apparatus into service, as is now being described, the starch liquor enters the cylinder A at the top and it falls through the perforations from diaphragm to diaphragm until it reaches the bottom of the cylinder. In falling through the atmosphere of steam in cylinder A, it is brought to the desired temperature by the latter if not already brought to that temperature in the heater H'. The valve in the test branch pipe E' is kept open. This permits the liquor to rise in the discharge pipe D as soon as its lower end is covered with the starch liquor. The discharge valve d is kept closed, and the level of the liquor consequently rises in the cylinder to form the "converting column" of liquor. It is permitted to thus rise until the liquor flowing from the branch test pipe E' shows by a proper testing reagent that the desired degree of conversion of the starch liquor has been reached. This indicates that the liquor at the bottom of the converter, or to be exact, at the top of the discharge pipe D has been subjected to the temperature long enough to effect the desired degree of conversion. The valve d in the discharge pipe D is now opened sufficiently to maintain the level of the liquor where it was when the adequate reaction was obtained. If this be done, the liquor flowing from the pipe D will all have been in the converting column the same length of time, namely the time which was required to fill the cylinder up to the said level, say to the level l, and the liquor flowing out will be all of practically the same degree of conversion, that is assuming the rate of delivery of the starch liquor into the cylinder, and its acidity and also the temperature in the converting column to all remain constant. This latter will be the case so long as the liquor added to the column from above is of a constant temperature for no heat is added to the converting column nor any taken from it except such as may be lost by conduction through the walls of the cylinder which may be rendered nil by a suitable non-conducting covering around the surface of the cylinder. The perforated diaphragms serve to evenly distribute the starch liquor over the surface of the converting column of liquor in the cylinder, to cause a uniform flow downward of the liquor from the top of the column to the outlet at the bottom of the same, and to prevent the agitation of the surface of the liquor to any considerable depth by the falling of the liquor upon the same. The perforated diaphragm that may be next above the surface of the liquor in the converting column breaks its fall, and the diaphragm next below the surface limits the said agitation to the liquor above it. The closer together the diaphragms are the more uniform will be the movement downward of the column of liquor throughout its entire cross section, the less will be the agitation of the liquor column at its surface and the less will be the danger of mixture of any portion of the moving converting column of liquor with the portions which next precede or next follow it in the column, something to be avoided in the interest of uniform conversion. While the apparatus is in service the vent valve v is left slightly open to permit of the escape of air and incondensable gases which might collect at the top of the converter cylinder A.

Any heat or vapor which may escape with the incondensable gases through the valve v and pipe V ultimately pass with the gases into the heater H and are utilized in heating the starch solution, while the gases escape from the heater H, through the vent pipe o to vacuum producing apparatus as the condenser $C^2$—the valve o' in the pipe being kept open for the purpose. By means of this vacuum apparatus and the connecting pipe o and valve o' a pressure below atmosphere may be maintained in the heater H' which will lower the water boiling temperature in the heater below the gelatinizing temperature of the starch liquors, and thereby prevent the formation of starch paste in the heater which might interfere with the proper flow of the starch liquor through the pump P into the high pressure heater H'. The lower pressure in the heater H permits a lower pressure than atmospheric in the expansion chamber T, and consequently a greater disengagement of vapor from the converted starch liquor and a greater transfer of heat thereby to the starch liquor in the heater H. It is apparent that any incondensable gases which may be contained in the starch liquor entering the bottom of the heater H', or which may be generated while the liquor is moving through this heater will all pass from the top of the latter into the cylinder A, and from it through the vent pipe V and intermediate connections into the low pressure heater H, and thence away through the vent pipe o after being cooled by rising against the falling shower of starch liquor.

J is a pipe for delivering into the cylinder below the lower diaphragm in the converting column a solution of the reagent (usually carbonate of soda) used for neutralizing the acid in the converted liquor. It is most convenient that this solution be of constant strength and be delivered into the converter at a constant speed. The solution thus delivered through the pipe J mixes with the acid liquor and passes with it up through the discharge pipe D, and into the expansion chamber T. The rate of inflow of the neutralizing solution is regulated by suitable means as by the hand valve j so as to produce in the outflowing liquor the desired conditions with respect to neutrality. The liquor in the converting column is, with a view to quick conversion, preferably kept at a temperature considerably above 212° Fahr., say at 280° Fahr., and at the corresponding pressure of 35 pounds above atmospheric. The converted liquor on entering the expansion chamber T in which the pressure is lower, say atmospheric, flashes in part into vapor, which vapor escapes from the tank through the outlet pipe *h*, into the heater H in which it heats more or less the incoming cold starch liquor while the converted liquor escapes through the outlet *t* into the sealing tank T' and thence escapes by the overflow *t'*. Neutralization of the acid in the converted liquor may be effected after the latter leaves the cylinder A, but in that case the escaping liquor and vapors are acid and are destructive to metal pipes and apparatus. For this reason I neutralize the acid while the liquor is still under pressure. With less efficiency perhaps with respect to making the escaping vapors neutral, but with greater ease on account of the lower pressure, the neutralizing solution may be delivered into the discharge pipe D above the valve *d*, as by the pipe J'. To better insure a thorough mixing of the neutralizing solution with the escaping liquors and vapors the pipe D may be fitted inside for a portion of its length with a spiral or other deflecting or mixing device as indicated by dotted lines at *z*. While the apparatus is in operation the valve *e* in the pipe E is kept slightly open so that there is always a flow of liquor through the pipe E from the discharge pipe D into the chamber T. This permits samples being taken at any time from the branch test pipe E' which will exactly show, if tested, the degree of conversion of the discharging liquor.

Assuming constancy with respect to other conditions, namely acidity, rate of flow of liquor through the converting column, and temperature in the latter, the degree of conversion in the liquor issuing from the discharge pipe D will vary with the length or depth of the converting column of liquor in the cylinder. For example, if the surface of this column is caused to stand at the level *l* and the conversion is right for the non-crystallizing product sold as "glucose," the conversion with the surface of the column held at some higher level *l'* will be proper for the solid product sold as "grape sugar." The level of the surface of the liquor column may be raised by closing the valve *d* in the discharge pipe D until the level is raised to the desired height by the inflowing liquor, and then opening the valve *d* to the degree which makes the outflow of liquor equal to the inflow as indicated by the level remaining constant. The level of the liquor is lowered by opening wider the valve *d* until the level falls to the point desired, and then closing the valve until the level remains constant. It is obvious that, maintaining a constant volume or height of converting column of liquor in the cylinder and a given temperature, the degree of conversion may be varied by increasing or lessening the rate of flow of the acidified liquor through the converting column since they respectively lessen or increase the time the acid liquor is in the converting column and subject to its temperature.

The cylinder A and the high pressure heater H', may be considered together as a converting apparatus formed of two connected members, in the first of which H', the starch liquor is heated approximately to the converting temperature with a partial conversion of the starch while in the second the conversion is completed by the heat imparted to the liquor in the first wholly or in part, while the expansion chamber T, heater H, and the intermediate connections and adjuncts may be considered as means for recovering heat from the converted liquor and employing it for heating the starch liquor preparatory to its passing to the converters.

I do not limit my invention to the particular construction or details of apparatus shown in the drawings and described in this specification.

By means of the apparatus and the mode of operation herein described, a product is obtained every constituent portion of which has approximately the same degree of conversion instead of being a product which is made up of portions having various degrees of conversion, the mixture of which forms the product which is obtained by the usual intermittent method of converting starch.

So far as I am aware, no product from starch conversion as an article of manufacture and commerce has ever been made the constituent parts of which have all practically the same degree of conversion.

I now claim as of my invention:

1. In converting apparatus, the combination of connected converting vessels, a starch heating tank, means for continuously introducing the starch from the heating tank to the first of the converting vessels, an expansion chamber, means for continuously introducing the converted liquor into the expansion chamber and for withdrawing it therefrom, and a vapor pipe leading from the expansion chamber to the heating tank.

2. The combination with a closed converter, of means for continuously supplying the same with starch and for simultaneously and continuously withdrawing the product of the conversion from said converter, means for introducing steam into the converter in quantities sufficient to maintain a pressure therein above atmospheric pressure and means for separating the steam from the converted liquor as it is discharged from the converter.

3. The combination with a converter, of means for continuously supplying the same with starch, means for simultaneously and continuously withdrawing the product of the conversion from the converter, means for heating the starch before it is supplied to the converter, and means for separating the steam from the converted liquor as it comes from the converter and for conducting such steam to the means for heating the starch before it is supplied to the converter.

4. The combination with a closed converter, comprising a plurality of connected vessels, of means for maintaining steam in said vessels at pressure above atmospheric pressure, means for continuously supplying said converter with starch, and means for simultaneously and continuously withdrawing the product of such conversion from said converter and for separating the steam therefrom.

5. Converting apparatus, comprising a closed converter, means for maintaining a pressure in said converter above atmospheric pressure and an expansion chamber which receives the product of the conversion from the converter, the expansion chamber provided with a vapor discharge pipe and a separate liquor discharge pipe.

6. Converting apparatus, comprising a converter, an expansion chamber which receives the product of the conversion from the converter, a starch heating tank, means for introducing the starch from the same into the converter, and a vapor discharge pipe leading from the expansion chamber to the starch heating tank.

7. Converting apparatus, comprising a converter, a starch heating tank, means for conducting the starch from the heating tank to the converter, and means for taking steam from the converter to the heating tank.

8. Converting apparatus, comprising two connected converting vessels, means for introducing the starch into the first of said vessels, means for heating said liquor in said vessels, and means for withdrawing the product of the conversion from the second of said vessels.

9. Converting apparatus, comprising two connected converting vessels, means for introducing the starch into the first of said vessels, means for heating said liquors in said vessels and for agitating the liquors in the first vessel, and means for withdrawing the product of the conversion from the second of said vessels, the second of said vessels being so constructed as to give a relatively undisturbed flow.

10. Converting apparatus, comprising a plurality of connected converting vessels, means for continuously supplying the liquor to be converted to the first of said vessels, means for continuously withdrawing the liquor from the last of said vessels, and an expansion tank which receives the liquor from the converting vessels, said expansion tank being provided with a vapor discharge and a liquor discharge.

11. Converting apparatus, comprising a plurality of connected converting vessels, means for continuously supplying the liquor to be converted to the first of said vessels, means for continuously withdrawing the liquor from the last of said vessels, an expansion tank which receives the liquor from the converting vessels, said expansion tank being provided with a vapor discharge and a liquor discharge, and a starch heating tank connected with the vapor discharge of the expansion tank.

12. Converting apparatus, comprising a converting vessel in which the starch is heated under pressure, a heating tank for heating the starch before it goes to the converter, an expansion chamber which receives the starch from the converter, and means for conducting steam from the expansion chamber to the starch heating tank.

13. Converting apparatus, comprising a converter in which the starch is heated under pressure, said converter having a steam vent, a heating tank for heating the starch before it goes to the converter, and a steam pipe leading from the steam vent of the converter to the heating tank.

14. In converting apparatus, the combination with a closed converter, of a feed pipe leading into said converter, means for maintaining a pressure in said converter above atmospheric pressure, a discharge pipe extending upward from said converter and opening beneath the surface of the liquor therein, through which the converted liquor is discharged, and an expansion tank into which said discharge pipe delivers, provided with a liquor discharge pipe and a separate vapor discharge pipe.

15. In a starch converting vessel containing a flowing column of starch liquor in process of conversion as it moves along in the column of liquor, means for delivering the starch liquor to the liquor column at one end approximately evenly distributed over the cross section of the column of liquor; and means for drawing the liquor away from the other end of the column.

16. In a starch converting vessel containing a flowing column of starch liquor in process of conversion as it moves along in the column of liquor, means for delivering the starch liquor to the column at one end, and means for withdrawing the liquor from the other end of the column with approximate equality from the entire cross section of the column.

17. In a starch converting vessel containing a flowing column of starch liquor in process of conversion as it moves along in the column of liquor, means for delivering the starch liquor to one end of the liquor column approximately evenly distributed over the cross section of the liquor column, and means for withdrawing the liquor from the other end of the liquor column with approximate equality from the entire cross section of the column.

18. A closed converting vessel adapted for converting acidified starch liquors under the influence of pressure and heat and means of introducing a neutralizing agent into the converted liquor while still under pressure.

19. A closed converting vessel adapted for converting acidified starch liquors under the influence of pressure and heat and means of introducing a neutralizing agent into the converted liquor while still under pressure, a suitable heating device and means for utilizing the heat in the neutralized converted liquor in the heating device for heating purposes.

20. A closed converting vessel adapted for converting acidified starch liquors under the influence of pressure and heat and means of introducing a neutralizing agent into the converted liquor while still under pressure, and means for disengaging vapors from the neutralized converted liquor, and thereby producing neutral vapors for heating purposes.

21. A closed converting vessel adapted for converting acidified starch liquors in the presence of heat and pressure, a discharge pipe connecting to the converting vessel for conducting the converted liquor from the converting vessel and means for introducing a neutralizing agent into said pipe simultaneously with the passage of the converted liquor through the same.

22. A closed converting vessel adapted for converting acidified starch liquors in the presence of heat and pressure, a discharge pipe connecting to the converting vessel for conducting the converted liquor from the converting vessel and means for introducing a neutralizing agent into said pipe simultaneously with the passage of the converted liquor through the same, and baffles in the discharge pipe to assist in the mixing of the discharging liquor and the neutralizing agent.

23. A closed converting vessel adapted for converting starch liquors through the influence of heat and pressure, and means for disengaging vapors from the hot liquor converted in said converter at pressures below atmospheric.

24. A closed converting vessel adapted to converting starch liquors through the influence of heat and pressure, an expansion chamber, conduits between it and the converted adapted for conveying the converted liquor from the converter into the expansion chamber and means for maintaining a pressure below atmospheric in the expansion chamber during the passage of the converted liquor into the expansion chamber.

25. A closed converting vessel adapted to converting starch liquors through the influence of heat and pressure, a heating vessel adapted to using vapors for heating purposes, means for disengaging vapors from liquors converted in the converting vessel and for conducting them to the heating vessel and means for maintaining a pressure below atmospheric in the heating vessel.

26. A starch converting vessel, a number of starch liquor heaters connected in series by liquor conducting interconnecting pipes, a starch liquor supply pipe leading into the first heater of the series, a liquor conducting pipe leading from the last member of the series into the converting vessel, means for forcing the starch liquor through the heaters in succession and into the converting vessel and means for supplying steam to the several heaters respectively at different pressures increasing in the heaters with their distance from the initial heater of the series.

In testimony whereof I have signed my name to this specification in the presence of two subscribing witnesses.

S. MORRIS LILLIE.

Witnesses:
JOHN J. WALTER,
COLIN D. SMITH.